(12) United States Patent
Barnes, III

(10) Patent No.: US 10,239,475 B2
(45) Date of Patent: Mar. 26, 2019

(54) WIND NOISE THROB REDUCTION SYSTEM AND METHOD

(71) Applicant: FORD GLOBAL TECHNOLOGIES, LLC, Dearborn, MI (US)

(72) Inventor: Nolen Thomas Barnes, III, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/411,267

(22) Filed: Jan. 20, 2017

(65) Prior Publication Data
US 2018/0208135 A1    Jul. 26, 2018

(51) Int. Cl.
| | |
|---|---|
| *B60R 16/02* | (2006.01) |
| *B60R 16/023* | (2006.01) |
| *B60R 1/00* | (2006.01) |
| *B62D 25/04* | (2006.01) |
| *B62D 35/00* | (2006.01) |
| *G05D 3/12* | (2006.01) |
| *G10K 11/178* | (2006.01) |
| *B60R 1/07* | (2006.01) |
| *B60R 1/12* | (2006.01) |

(52) U.S. Cl.
CPC .......... *B60R 16/0232* (2013.01); *B60R 1/006* (2013.01); *B60R 1/07* (2013.01); *B60R 1/12* (2013.01); *B62D 25/04* (2013.01); *B62D 35/00* (2013.01); *G05D 3/12* (2013.01); *G10K 11/178* (2013.01); *G10K 11/17861* (2018.01); *G10K 11/17881* (2018.01); *B60Y 2306/09* (2013.01); *G10K 2210/12821* (2013.01); *G10K 2210/3045* (2013.01); *G10K 2210/3046* (2013.01)

(58) Field of Classification Search
CPC ..... B60R 1/006; B60Y 2306/09; B62D 25/04; B62D 35/00; G05D 3/12; G10K 11/178; G10K 11/1788; G10K 2210/12821; G10K 2210/3046
See application file for complete search history.

(56) References Cited

U.S. PATENT DOCUMENTS

| | | | |
|---|---|---|---|
| 4,915,485 A | 4/1990 | Ogasawara | |
| 6,340,231 B1 | 1/2002 | Polzer | |
| 6,419,300 B1 * | 7/2002 | Pavao | B60R 1/06 296/152 |

(Continued)

FOREIGN PATENT DOCUMENTS

| | | |
|---|---|---|
| JP | 2007050761 A | 3/2007 |
| JP | 2007269102 A | 10/2007 |
| JP | 2016159657 A | 9/2016 |

OTHER PUBLICATIONS

English Machine Translation of JP2007269102A.
(Continued)

*Primary Examiner* — Calvin Cheung
(74) *Attorney, Agent, or Firm* — Jason Rogers; Vichit Chea; King & Schickli, PLLC

(57) ABSTRACT

A wind noise throb reduction system includes a controller configured to reduce wind noise throb, an active noise cancellation subsystem responsive to the controller and a dynamic airflow control subsystem responsive to the controller. A related method of reducing wind noise throb in a passenger compartment of a motor vehicle is also provided.

18 Claims, 8 Drawing Sheets

(56) References Cited

U.S. PATENT DOCUMENTS

| | | | |
|---|---|---|---|
| 6,712,413 B1 | 3/2004 | Flowerday | |
| 6,916,100 B2 | 7/2005 | Pavao | |
| 7,073,914 B2 | 7/2006 | Pavao | |
| 7,530,625 B2 * | 5/2009 | Gulker | B60R 1/06 296/1.11 |
| 7,621,588 B2 | 11/2009 | Zhu et al. | |
| 7,641,275 B2 | 1/2010 | Campbell et al. | |
| 8,583,329 B2 | 11/2013 | Breed | |
| 9,947,310 B2 * | 4/2018 | Iida | H04R 1/025 |
| 2003/0026008 A1 | 2/2003 | Tanaka | |
| 2006/0274442 A1 | 12/2006 | Brouwer et al. | |
| 2008/0306661 A1 * | 12/2008 | Campbell | B60J 1/20 701/49 |
| 2009/0244744 A1 | 10/2009 | Okamoto et al. | |
| 2010/0157451 A1 | 6/2010 | Sugiyama | |
| 2011/0109448 A1 | 5/2011 | Browne et al. | |
| 2011/0141590 A1 * | 6/2011 | Iseki | B60R 1/074 359/841 |
| 2012/0091752 A1 * | 4/2012 | Algermissen | B60J 7/22 296/180.1 |
| 2012/0134037 A1 * | 5/2012 | Sumi | B60R 1/072 359/872 |
| 2012/0154940 A1 | 6/2012 | Kawanishi et al. | |
| 2015/0104026 A1 * | 4/2015 | Kappus | G10K 11/178 381/63 |

OTHER PUBLICATIONS

English Machine Translation of JP2007050761A.
English Machine Translation of JP2016159657A.
Office action dated Dec. 17, 2018 for U.S. Appl. No. 15/411,430, filed Jan. 20, 2017.

* cited by examiner

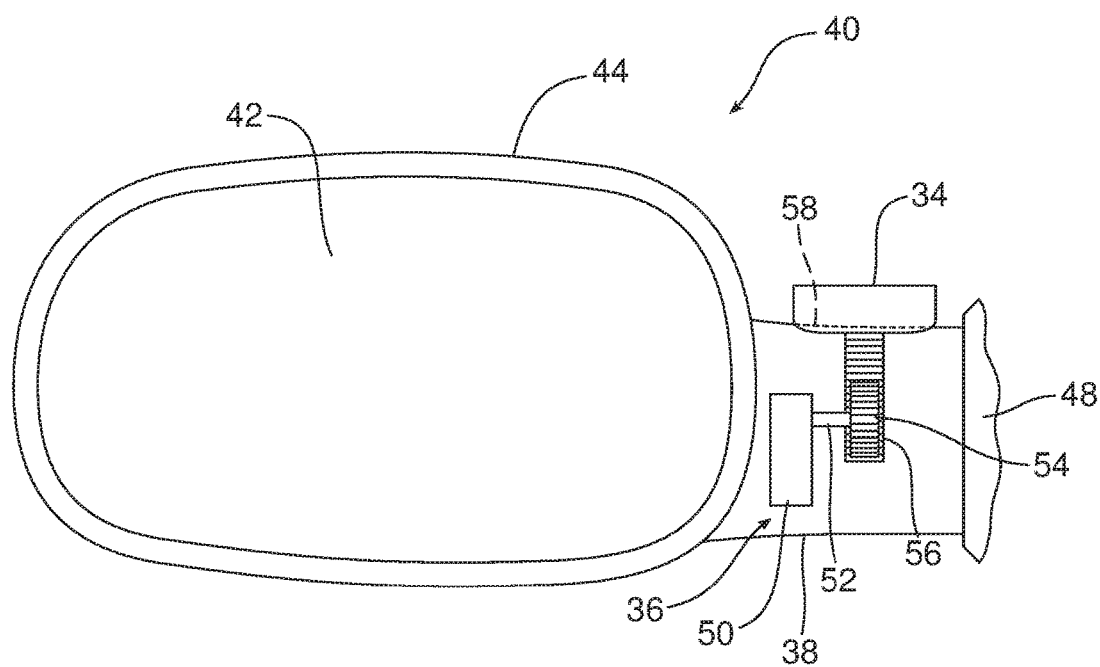

WIND NOISE THROB REDUCTION SYSTEM AND METHOD

TECHNICAL FIELD

This document relates generally to the motor vehicle equipment field and, more particularly, to a system and method for reducing wind noise throb commonly associated with motor vehicles when one or more windows of the motor vehicle are open and the motor vehicle is traveling at roadway speeds.

BACKGROUND

When one or more windows are opened in a motor vehicle moving at roadway speeds of, for example above 65 kph, a standing wave may form in the passenger compartment of the motor vehicle. When this resonance is combined with a vortex of wind from the side mirror or a pillar adjacent the window, a booming wind noise throb may occur. This wind noise throb may be very loud (e.g. on the order of 125 dB) and at a low frequency of, for example, 50 hertz. Such a wind noise throb is unpleasant and leads to driver or passenger dissatisfaction.

In order to mitigate this problem it has been necessary in the past to either close all the windows, open other windows or alter the speed of the motor vehicle to thereby change the standing wave in the passenger compartment or change the vortex interaction with the wave. This document relates to a new and improved system and method for reducing wind noise throb to acceptable levels without having to close windows, open other windows or adjust the speed of the motor vehicle.

SUMMARY

In accordance with the purposes and benefits described herein, a wind noise throb reduction system is provided. That wind noise throb reduction system comprises a controller configured to reduce wind noise throb, an active noise cancellation subsystem responsive to the controller and a dynamic airflow control subsystem responsive to the controller.

The controller may be configured to include a first data input for sound pressure data from the passenger compartment of the motor vehicle. The controller may also be configured to include a second data input for window position data.

The active noise cancellation subsystem may include a sound pressure monitoring device in the passenger compartment of the motor vehicle. That sound pressure monitoring device is connected to the first data input of the controller. In some of the many possible embodiments, the sound pressure monitoring device may include a first microphone and a second microphone.

The active noise cancellation subsystem may also include an amplifier and a speaker. The amplifier is responsive to the controller and functions to drive the speaker and generate an active noise cancellation signal.

The wind noise throb reduction system may also include a window position monitoring device that is connected to the second data input of the controller. That window system monitoring device may comprise a sensor, a window regulator controller or any other device capable of providing window position data to the controller.

The dynamic airflow control subsystem of the wind noise throb reduction system may include a dynamic surface and an actuator displacing the dynamic surface in response to the controller in order to reduce wind noise throb. The dynamic surface may be carried on a support arm of a side mirror of the motor vehicle. The dynamic surface may be carried on a mirror housing of a side mirror of the motor vehicle. The dynamic surface may be carried on a pillar of the motor vehicle adjacent a window of the motor vehicle.

In some of the many possible embodiments of the wind noise throb reduction system, the dynamic surface is a mirror housing of a side mirror carried on the motor vehicle. In such an embodiment the dynamic airflow control subsystem may further include a second actuator connected to a mirror in the mirror housing. Further, the controller may be configured to displace the mirror within the mirror housing in order to maintain a constant visual field in the mirror as the mirror housing is displaced to reduce wind noise throb.

In accordance with an additional aspect, a method is provided for reducing wind noise throb in a passenger compartment in a motor vehicle. That method comprises the steps of (a) monitoring, by a monitoring device, motor vehicle window position, (b) monitoring, by a sound pressure monitoring device, sound pressure in the passenger compartment and (c) generating, by an active noise cancellation subsystem an active noise cancellation signal.

The method may further include the step of displacing, by a dynamic airflow control subsystem, a dynamic surface on the motor vehicle to direct airflow away from an open window only when wind noise throb still exceeds a threshold level following generating the active noise cancellation signal.

Still further, the method may include the step of positioning the dynamic surface on the mirror housing. The method may include the step of positioning the dynamic surface on a support arm of the mirror housing. The method may include the step of positioning the dynamic surface on a pillar adjacent the open window.

When the dynamic surface is a housing of a side mirror of the motor vehicle, the method may further include the step of displacing, by the dynamic airflow control subsystem, a mirror within the mirror housing so as to maintain a desired visual field in the mirror as the mirror housing is displaced. This allows the driver to have an uninterrupted and consistent view of traffic conditions in that mirror even as the mirror housing is being adjusted to reduce wind noise throb.

In the following description, there are shown and described several preferred embodiments of the wind noise throb reduction system and the related method of reducing wind noise throb in a passenger compartment of a motor vehicle. As it should be realized, the wind noise throb reduction system and related method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the wind noise throb reduction system and together with the description serve to explain certain principles thereof.

FIG. 2b is a view of the first possible operating embodiment of the dynamic airflow control system shown in FIG. 2a but shown in the deployed position.

FIG. 3a illustrates the dynamic surface of the subsystem in the home position while FIG. 3b illustrates the dynamic surface of the subsystem in the deployed position.

Reference will now be made in detail to the present preferred embodiments of the wind noise throb reduction system, examples of which are illustrated in the accompanying drawing figures.

DETAILED DESCRIPTION

Figure 1:
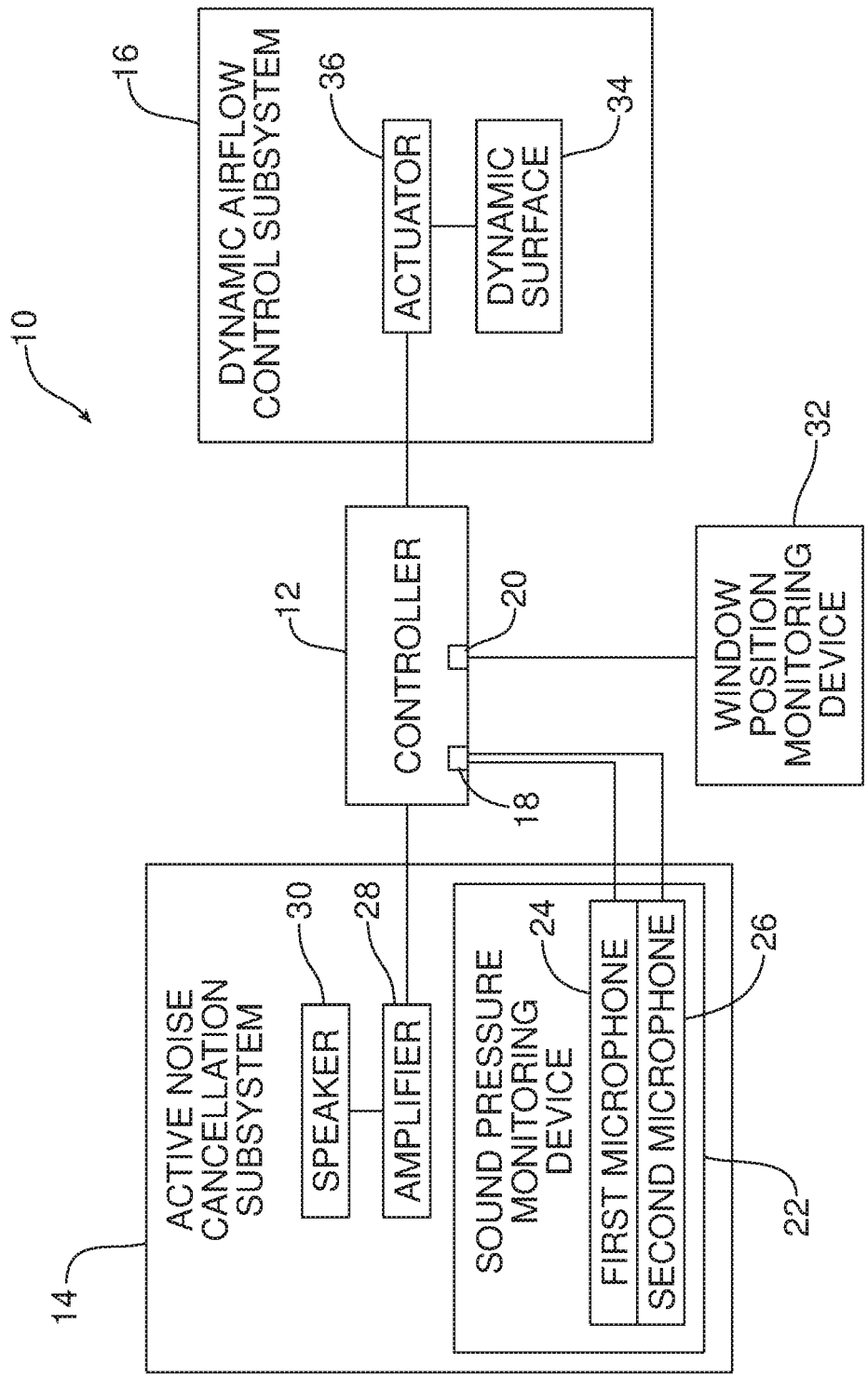
FIG. 1 is a schematic block diagram of a first possible embodiment of the wind noise throb reduction system.

Reference is now made to FIG. 1 schematically illustrating the new and improved wind noise throb reduction system 10. That wind noise throb reduction system 10 includes a controller 12 configured to reduce wind noise throb in a motor vehicle. The controller 12 may comprise a computing device such as a dedicated microprocessor or electronic control unit (ECU) operating in accordance with instructions from appropriate control software. Thus, the controller 12 may comprise one or more processors, one or more memories and one or more network interfaces all in communication with each other over a communication bus.

The wind noise throb reduction system 10 also includes an active noise cancellation subsystem 14 and a dynamic airflow control subsystem 16. Both the active noise cancellation subsystem 14 and the dynamic airflow control subsystem 16 are responsive to the controller 12 in a manner that will be described in greater detail below.

In the embodiment illustrated in FIG. 1, the controller 12 is configured to include a first data input 18 for sound pressure data in the passenger compartment of the motor vehicle. Further, the controller 12 is configured to include a second data input 20 for window position data respecting one or more windows of the motor vehicle. In some embodiments, the controller 12 is configured to include a data input (not shown) for position data respecting the dynamic airflow control subsystem 16 and, more specifically, the dynamic surface 34 of that subsystem as described in greater detail below.

In the illustrated embodiment, the active noise cancellation subsystem 14 includes a sound pressure monitoring device 22 provided in the passenger compartment of the motor vehicle. The sound pressure monitoring device 22 is connected to the first data input 18 of the controller 12. In the illustrated embodiment, the sound pressure monitoring device 22 includes a first microphone 24 and a second microphone 26.

As further illustrated in FIG. 1, the active noise cancellation subsystem 14 also includes an amplifier 28 and a speaker 30. The amplifier 28 is responsive to the controller 12 and functions to drive the speaker 30 to produce an active noise cancellation signal. In some embodiments, the amplifier 28 and speaker 30 are part of a dedicated active cancellation subsystem 14. In other possible embodiments, the amplifier 28 and speaker 30 form a part of the audio system of the motor vehicle.

As further illustrated in FIG. 1, the wind noise throb reduction system 10 may also include a window position monitoring device 32 connected to the second data input 20 of the controller 12. The window position monitoring device 32 may comprise one or more sensors or other means for monitoring the position of the one or more windows of the motor vehicle. In some embodiments, the window position monitoring device 32 may comprise one or more window regulator controllers of the motor vehicle for controlling the opening and closing function of the various motor vehicle windows.

The dynamic airflow control subsystem 16 may include a dynamic surface 34 and an actuator 36 for displacing the dynamic surface in response to the controller 12 in a manner appropriate for reducing wind noise throb. As will be apparent from the following description, the dynamic surface 34 may be carried on a support arm 38 of a side mirror assembly 40 as illustrated in FIGS. 2a and 2b, on a housing 44 of a side mirror assembly 40 as illustrated in FIGS. 3a and 3b or on a pillar 46 of the motor vehicle adjacent a window W as illustrated in FIGS. 4a and 4b.

Figure 2A:
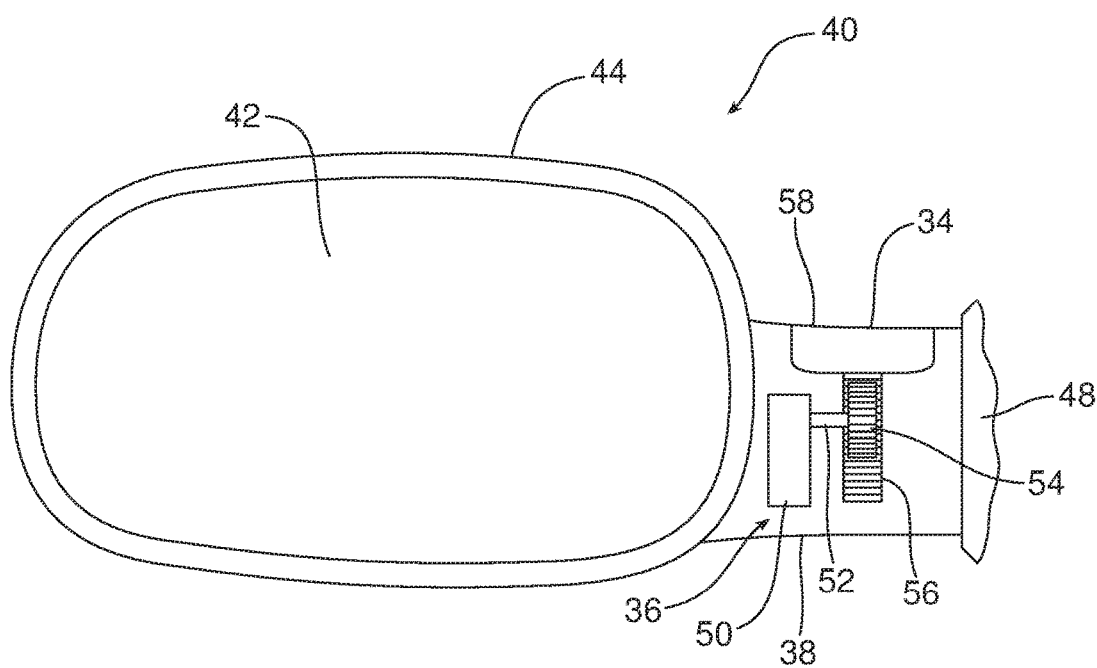
FIG. 2a is a schematic illustration of a first possible operating embodiment of the dynamic airflow control subsystem of the wind noise throb reduction system illustrated in FIG. 1 shown in the home position.

More specifically, as illustrated in FIGS. 2a and 2b, a side mirror assembly 40 includes the mirror 42 held in the mirror housing 44 that is connected to the side 48 of the motor vehicle by the support arm 38. As illustrated, the dynamic surface 34 is a spoiler comprising a portion of the surface of the support arm 38 that is displaceable between a home position flush in the support arm (see FIG. 2a) and a raised or deployed position (see FIG. 2b) for deflecting air away from the side mirror assembly 40 and/or the window of the motor vehicle or in a manner to alter the flow pattern in a way that precludes the wind buffeting.

In the illustrated embodiment, the actuator 36 comprises a drive motor 50 having a drive shaft 52 keyed to a pinion 54. The pinion 54 meshes with a gear rack 56 connected to and extending from the rear end of the dynamic surface 34. When the dynamic surface 34 is in the fully raised and deployed position illustrated in FIG. 2b, the rear end thereof is raised while the front end thereof pivots about a hinge 58.

Figure 3A:
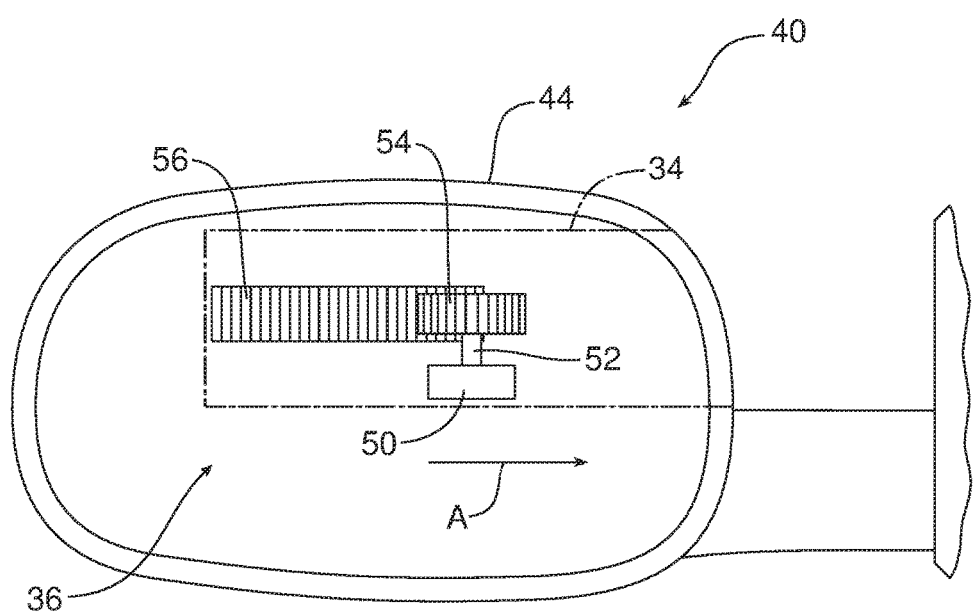
FIGS. 3a and 3b are schematic illustrations of a second possible operating embodiment of the dynamic airflow control subsystem.
Figure 3B:
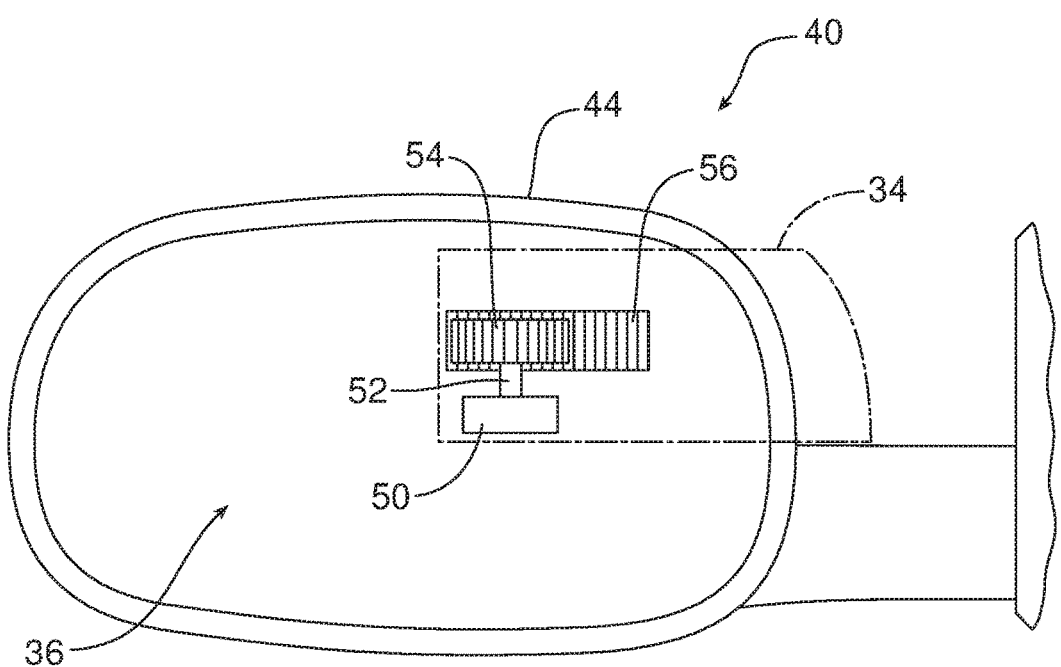
Figure 4A:
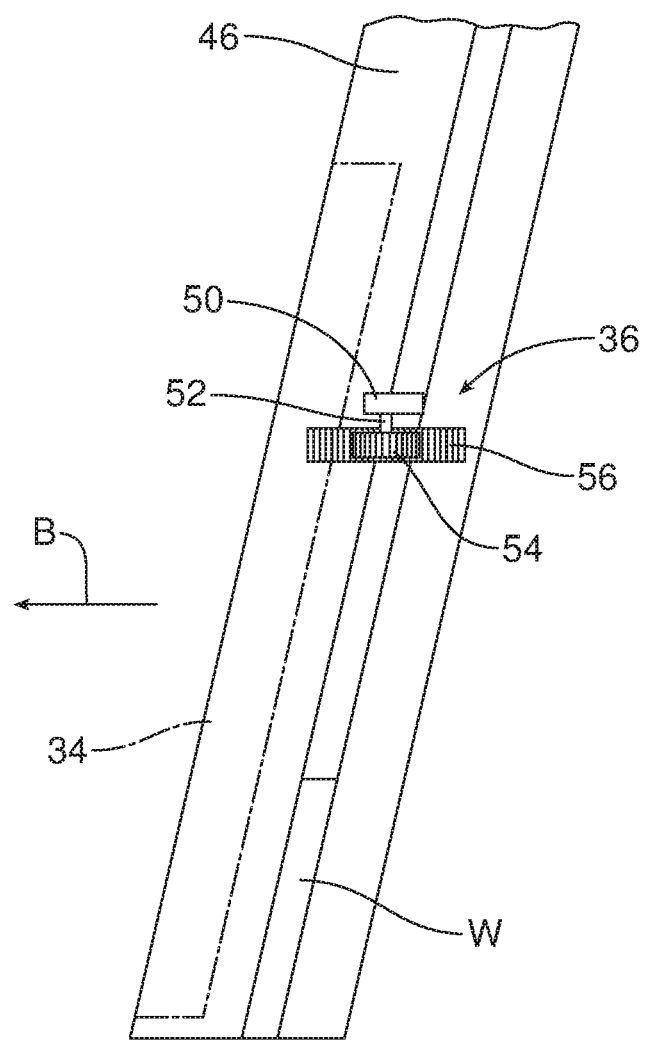
FIGS. 4a and 4b are schematic illustrations of a third possible operating embodiment of the dynamic airflow control subsystem illustrated, respectively, in the home position and the deployed position.
Figure 4B:
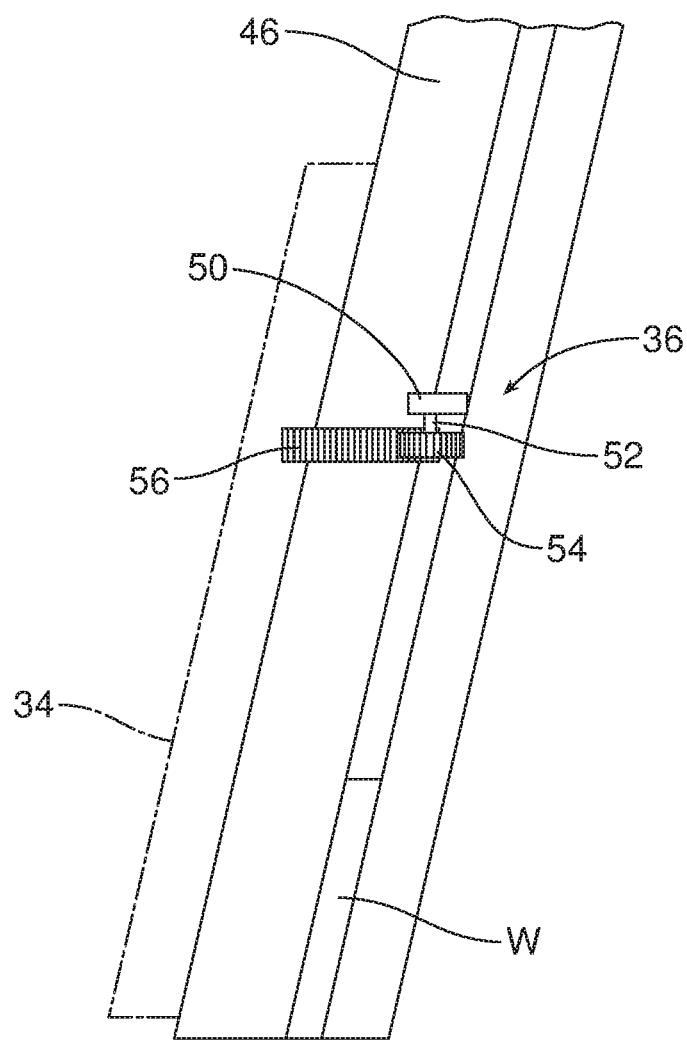

In the embodiment illustrated in FIGS. 3a and 3b, the dynamic surface 34 is a part of the mirror housing 45. In the normal or home position shown in FIG. 3a, the dynamic surface 34 fits flush with the remaining portion of the mirror housing 44. When deployed in the direction of action arrow A, the dynamic surface 34 extends from the mirror housing 44 toward the side 48 of the motor vehicle above the support arm 38 deflecting air away from the gap formed between the mirror housing 44 and the side 48 of the motor vehicle, thereby disrupting the airflow pattern and reducing wind noise throb. In this embodiment, the actuator 36 once again comprises a drive motor 50 that drives a pinion 54 through a drive shaft 52. The pinion 54 engages a gear rack 56 connected to the dynamic surface 34. Thus, the drive motor 50 turns the pinion 54 to displace the gear rack 56 and dynamic surface 34 between the home and deployed positions in response to the controller 12. The necessary movement of the dynamic surface may be on the order of as little as 10-15 mm.

In the embodiment illustrated in FIGS. 4a and 4b, the dynamic surface 34 is a part of the pillar 46. In the home position illustrated in FIG. 4a, the dynamic surface 34 fits flush with the remaining portion of the pillar 46. When deployed, the dynamic surface 34 extends outwardly (note action arrow B) from the pillar 46 away from the window W so as to deflect air away from the window opening and thereby reduce wind noise throb. In this embodiment, the actuator 36 once again comprises a drive motor 50 that is connected by a drive shaft 52 to a pinion 54 that drives a gear rack 56 connected to the dynamic surface 34. The dynamic surface 34 pivots about a hinge at the front end thereof which is hidden from view.

Figure 5:
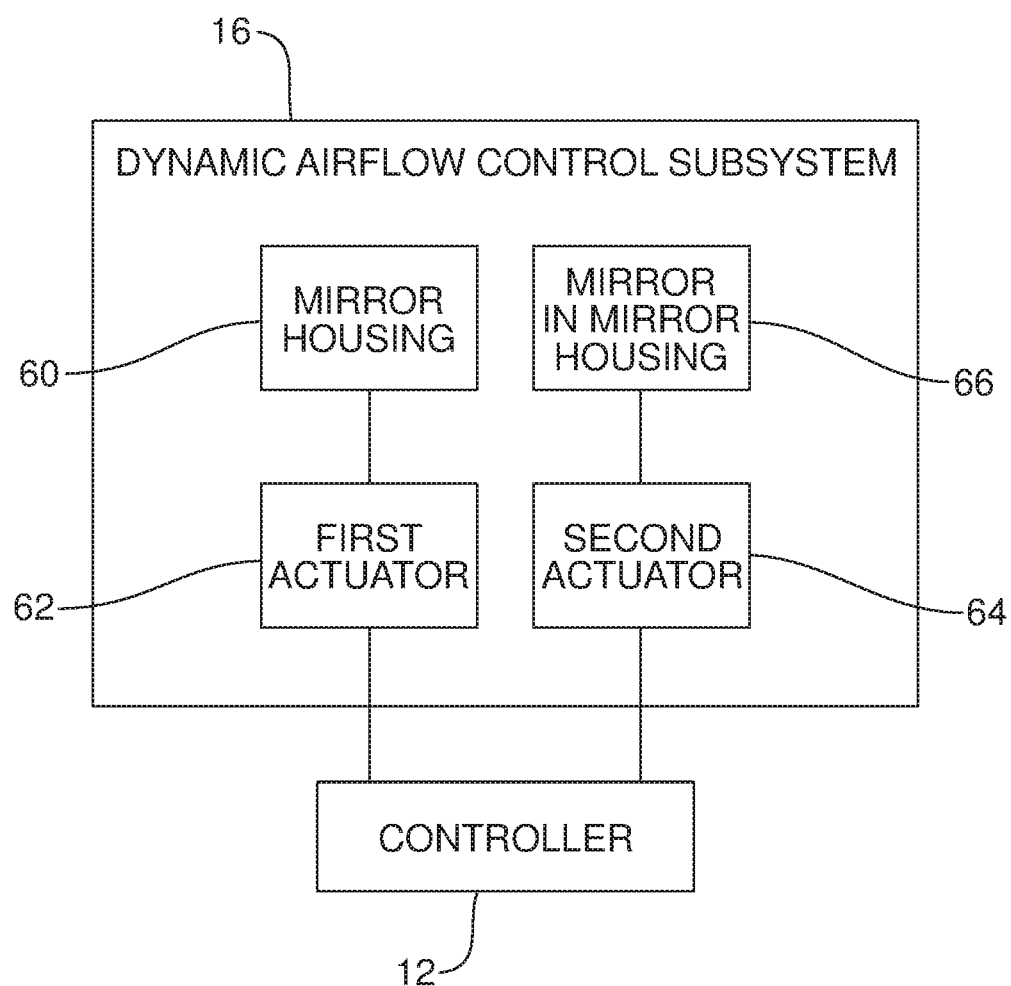
FIG. 5 is a schematic block diagram of yet another possible embodiment of the dynamic airflow control subsystem.

Reference is now made to FIG. 5 which schematically illustrates another possible embodiment of dynamic airflow control subsystem 16. In this embodiment, the dynamic airflow control subsystem 16 includes a first actuator 62 which is connected to the dynamic surface which in this embodiment is the mirror housing 60. The dynamic airflow control subsystem 16 also includes a second actuator 64 connected to the mirror 66 held in the mirror housing 60.

The first actuator 62 is responsive to the controller 12 and displaces the mirror housing 60 so as to reduce wind noise throb. As the mirror housing 60 is being displaced by the first actuator 62, the controller 12 sends operating signals to the second actuator 64. In response to those signals, the second actuator 64 displaces the mirror 66 within the mirror housing 60 in a manner necessary to maintain a constant or consistent visual field in the mirror 66 that allows the driver of the motor vehicle an uninterrupted view of the driving environment through that mirror 66 even as the mirror housing is being repositioned to reduce wind noise throb.

Consistent with the above description, a method is provided of reducing wind noise throb in a passenger compartment of a motor vehicle. That method comprises the steps of: (a) monitoring, by a window position monitoring device 32, the position of the windows of the motor vehicle, (b) monitoring, by a sound pressure monitoring device 22, sound pressure in the passenger compartment of the motor vehicle and generating, by an active noise cancellation subsystem 14, an active noise cancellation signal.

In addition, the method may include the step of displacing, by a dynamic airflow control subsystem 16, a dynamic surface 34 on the motor vehicle to alter the flow around the open window so as to reduce wind noise throb. In some of the many possible embodiments, this may only be done when the wind noise throb still exceeds a threshold level following generating the active noise cancellation signal through operation of the active noise cancellation subsystem 14.

As illustrated in FIGS. 2a and 2b, the method may include positioning the dynamic surface 34 on the support arm 38 of the side mirror assembly 40. As illustrated in FIGS. 3a and 3b, the method may include positioning the dynamic surface 34 on the mirror housing 44 of the side mirror assembly 40. As illustrated in FIGS. 4a and 4b, the method may include positioning the dynamic surface 34 on a pillar 46 of the motor vehicle adjacent the open window W.

As illustrated in FIG. 5, where the dynamic surface is a mirror housing 60, the method may include displacing, by the dynamic airflow control subsystem 16 the mirror 66 in the mirror housing so as to maintain a visual field in the mirror as the mirror housing is displaced. In such an embodiment, it should be appreciated that the controller 12 has been configured to maintain the visual field in the mirror 66 as the mirror housing 60 is displaced to reduce wind noise throb.

The foregoing has been presented for purposes of illustration and description. It is not intended to be exhaustive or to limit the embodiments to the precise form disclosed. Obvious modifications and variations are possible in light of the above teachings. For example, while the embodiments of the wind noise throb reduction system 10 illustrated in the drawing figures and described above include a single controller 12, it should be appreciated that the wind noise throb reduction system could include two controllers in communication with each other: a first controller for the active noise cancellation subsystem and a second controller for the dynamic airflow control subsystem 16. Further, in the illustrated embodiment of FIG. 1, the sound pressure monitoring device 22 comprises a first microphone 24 and a second microphone 26. It should be appreciated that a single microphone or more than two microphones may be utilized. All such modifications and variations are within the scope of the appended claims when interpreted in accordance with the breadth to which they are fairly, legally and equitably entitled.

What is claimed:

1. A wind noise throb reduction system for a motor vehicle, comprising:
   a controller configured to reduce wind noise throb and to include a first data input for sound pressure data;
   an active noise cancellation subsystem responsive to said controller; and
   a dynamic airflow control subsystem responsive to said controller.

2. The wind noise throb reduction system of claim 1, wherein said controller is configured to include a second data input for window position data.

3. The wind noise throb reduction system of claim 2, wherein said active noise cancellation subsystem includes a sound pressure monitoring device in a passenger cabin of said motor vehicle, said sound pressure monitoring device being connected to said first data input of said controller.

4. The wind noise throb reduction system of claim 3, wherein said sound pressure monitoring device includes a first microphone and a second microphone.

5. The wind noise throb reduction system of claim 4, wherein said active noise cancellation subsystem includes an amplifier and a speaker generating an active noise cancellation signal in response to said controller.

6. The wind noise throb reduction system of claim 5, further including a window position monitoring device connected to said second data input of said controller.

7. The wind noise throb reduction system of claim 6, wherein said dynamic airflow control subsystem includes a dynamic surface and an actuator displacing said dynamic surface in response to said controller.

8. The wind noise throb reduction system of claim 7, wherein said dynamic surface is carried on a support arm of a side mirror on said motor vehicle.

9. The wind noise throb reduction system of claim 7, wherein said dynamic surface is carried on a mirror housing of a side mirror on said motor vehicle.

10. The wind noise throb reduction system of claim 7, wherein said dynamic surface is carried on a pillar of said motor vehicle adjacent a window of said motor vehicle.

11. The wind noise throb reduction system of claim 7, wherein said dynamic surface is a mirror housing of a side mirror carried on said motor vehicle.

12. The wind noise throb reduction system of claim 11, wherein said dynamic airflow control subsystem further includes a second actuator connected to a mirror on said mirror housing.

13. The wind noise throb reduction system of claim 12, wherein said controller is further configured to maintain a visual field in said mirror as said mirror housing is displaced to reduce wind noise throb.

14. A method of reducing wind noise throb in a passenger compartment of a motor vehicle, comprising:
- monitoring, by a window position monitoring device, motor vehicle window position;
- monitoring, by a sound pressure monitoring device, sound pressure in said passenger compartment;
- generating, by an active noise cancellation subsystem, an active noise cancellation signal; and
- displacing, by a dynamic airflow control subsystem, a dynamic surface on said motor vehicle to direct airflow away from an open window only when wind noise throb still exceeds a threshold level following generating said active noise cancellation signal.

15. The method of claim 14, including positioning said dynamic surface on a mirror housing.

16. The method of claim 14, including positioning said dynamic surface on a support arm for a mirror housing.

17. The method of claim 14, including positioning said dynamic surface on a pillar adjacent said open window.

18. The method of claim 14, wherein said dynamic surface is a housing of a side mirror of said motor vehicle, said method further including displacing, by said dynamic airflow control subsystem a mirror in said mirror housing so as to maintain a visual field in said mirror as said mirror housing is displaced.

\* \* \* \* \*